United States Patent
Khamatnurova et al.

(10) Patent No.: US 10,723,940 B2
(45) Date of Patent: Jul. 28, 2020

(54) AQUEOUS-BASED EPOXY RESIN MICROEMULSION

(71) Applicant: Halliburton Energy Services, Inc., Houston, TX (US)

(72) Inventors: Tatyana V. Khamatnurova, Houston, TX (US); Jeremy A. Holtsclaw, Kingwood, TX (US); Travis Hope Larsen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/080,869

(22) PCT Filed: May 26, 2016

(86) PCT No.: PCT/US2016/034440
§ 371 (c)(1),
(2) Date: Aug. 29, 2018

(87) PCT Pub. No.: WO2017/204812
PCT Pub. Date: Nov. 30, 2017

(65) Prior Publication Data
US 2019/0112522 A1    Apr. 18, 2019

(51) Int. Cl.
| | | |
|---|---|---|
| C09K 8/88 | (2006.01) | |
| C09K 8/60 | (2006.01) | |
| E21B 33/138 | (2006.01) | |
| E21B 43/22 | (2006.01) | |
| C09K 8/94 | (2006.01) | |
| C09K 8/42 | (2006.01) | |

(Continued)

(52) U.S. Cl.
CPC .............. *C09K 8/885* (2013.01); *C09K 8/38* (2013.01); *C09K 8/42* (2013.01); *C09K 8/44* (2013.01); *C09K 8/5755* (2013.01); *C09K 8/602* (2013.01); *C09K 8/88* (2013.01); *C09K 8/94* (2013.01); *E21B 33/138* (2013.01)

(58) Field of Classification Search
CPC .. C09K 8/602; C09K 8/52; C09K 8/68; E21B 33/138; E21B 41/00
See application file for complete search history.

(56) References Cited

U.S. PATENT DOCUMENTS

| 4,194,919 A | 3/1980 | Hattori et al. |
|---|---|---|
| 2005/0034862 A1 | 2/2005 | Nguyen |

(Continued)

FOREIGN PATENT DOCUMENTS

WO    2010070284    6/2010

OTHER PUBLICATIONS

International Search Report and Written Opinion for PCT/US2016/034440 dated Jan. 17, 2017.

*Primary Examiner* — Zakiya W Bates
(74) *Attorney, Agent, or Firm* — Thomas Rooney; C. Tumey Law Group PLLC

(57) ABSTRACT

In some examples a method of well treatment may comprise: providing a treatment fluid comprising a microemulsified resin additive, wherein the microemulsified resin additive comprises a continuous phase and a discontinuous phase, wherein the continuous phase comprises an aqueous liquid, wherein the discontinuous phase is in form of micelles of about 200 nm or less in diameter and comprises a resin; introducing the treatment fluid into a subterranean formation penetrated by a wellbore; and allowing the treatment fluid to set in the subterranean formation.

19 Claims, 2 Drawing Sheets

(51) Int. Cl.
*C09K 8/38* (2006.01)
*C09K 8/44* (2006.01)
*C09K 8/575* (2006.01)

(56) References Cited

U.S. PATENT DOCUMENTS

2007/0187097 A1 8/2007 Weaver et al.
2008/0135251 A1 6/2008 Nguyen et al.
2010/0326660 A1 12/2010 Ballard et al.

AQUEOUS-BASED EPOXY RESIN MICROEMULSION

BACKGROUND

Hydrocarbon producing wells are often treated with epoxy resins during various stages of drilling, fracturing, and production. Epoxy resins may be used for sand control during production stages to consolidate fines or during abandonment to penetrate crevices and micro-annuli inaccessible to conventional cement. Once the epoxy is placed, it may cure in situ and provide mechanical strength to mitigate particle and gas migration.

Epoxy resins are often used in compositions that comprise organic solvent. The organic solvents may be used to decrease the viscosity of the epoxy resin for ease of handling and pumping, for example. However, the organic solvents may reduce the flash point of the composition, thus raising additional safety concerns. Thus, it has been proposed to use aqueous-based epoxy resin emulsions that may have lower viscosity with a high flash point. Drawback to the aqueous-based epoxy resin emulsions may be that the epoxy resins may thermodynamically unstable in emulsion form, such that the emulsion droplets may coalesce over time, reducing their ability to penetrate into tight formations, for example.

BRIEF DESCRIPTION OF THE DRAWINGS

These drawings illustrate certain aspects of some of the embodiments of the present invention, and should not be used to limit or define the invention.

DETAILED DESCRIPTION

Figure 1:
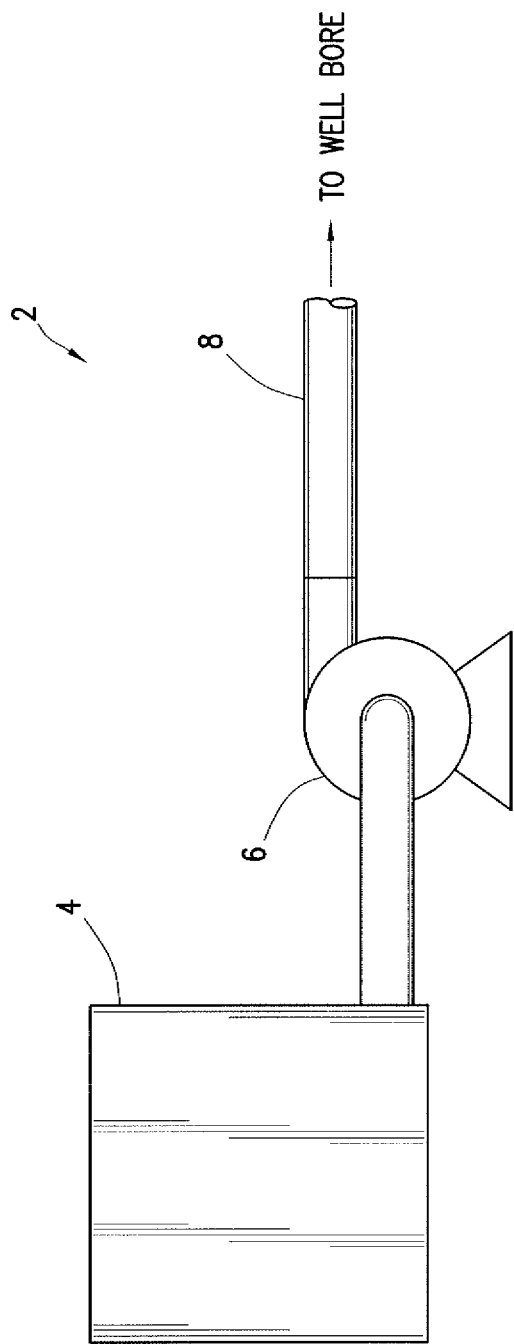
FIG. 1 is a schematic illustration of an example fluid handling system for the preparation and delivery of a treatment fluid into a wellbore.

The systems, methods, and/or compositions disclosed herein may relate to subterranean operations and, in some systems, methods, and compositions, to introduction of a treatment fluid comprising a microemulsified resin additive, a hardening agent, and a carrier fluid, into a subterranean formation penetrated by a wellbore. In particular, a microemulsified resin additive may comprise a resin composition and an aqueous fluid. The formation treatment may be performed at any stage of the well life. In particular, the treatment fluid may be used as a sand consolidation fluid, for example, that may be introduced before production begins to consolidate incoherent sand formations. A microemulsified resin additive may have many potential advantages, only some of which may be alluded to herein. A microemulsified resin additive may have deeper penetration in to tight sand formations and may be more thermodynamically stable compared to a non-microemulsified resin additive. Furthermore, a treatment fluid comprising microemulsified resin additive may be foamable with exiting surfactant technologies.

The microemulsified epoxy resin additive may comprise a continuous phase comprising an aqueous liquid and a discontinuous phase which may comprise a resin composition. The microemulsified epoxy resin additive described herein may generally be classified as oil in water. Suitable aqueous liquids that may be used in the microemulsified epoxy resin additive may include fresh water, salt water, brine, seawater, or any other aqueous liquid that does not undesirably react with the other components used herein or with the subterranean formation. Without limitation, where long-term stability of the emulsion is desired, the aqueous fluid may be one that is substantially free of salts. As used herein, "long term stability" refers to the ability of the emulsion to remain stable over a period of at least one month, preferably three or more months, and more preferably for about a year. It should be within the ability of one skilled in the art with the benefit of this disclosure to determine if and how much salt may be tolerated in the microemulsified epoxy resin additive of the present invention before it becomes problematic for the stability of the emulsion.

The aqueous liquid may be included in the microemulsified epoxy resin additive in an amount suitable for a particular application. By way of example, the continuous phase may be considered an aqueous-based continuous phase and the microemulsified epoxy resin additive may be considered an aqueous-based emulsion. Without limitation, the aqueous liquid may be present in the microemulsified epoxy resin additive in an amount in the range of about 20% to about 99.9% by volume of the microemulsified epoxy resin additive. By way of example, the aqueous liquid may be present in the microemulsified epoxy resin additive in an amount in the range of about 60% to about 99.9% by volume of the microemulsified epoxy resin additive. Other ranges for use of the aqueous liquid may be suitable as well, for example, depending on the other components of the microemulsified epoxy resin additive.

The discontinuous phase may be in the form of micelles that are about 1 micron or less, for example, about 200 nanometers or less, or about 100 nanometers or less. By way of example, substantially all of the micelles (90%, 95%, 99%, or more) of the micelles may be about 1 micron or less or potentially even about 100 nanometers or less. Some microemulsified epoxy resin additives may have micelle a size range from about 1 nanometer to about 20 nanometers, about 20 nanometers to about 50 nanometers, about 50 nanometers to about 70 nanometers, about 70 nanometers to about 70 nanometers to about 100 nanometers, or about 10 nanometers to about 50 nanometers. The micelles may comprise a resin composition. In some examples, a resin composition may comprise a resin substantially free of other components and may be considered a pure or nearly pure resin. In other examples, a resin composition may comprise a resin and a solvent or diluent.

As used herein, the term "resin" refers to any of a number of physically similar polymerized synthetics or chemically modified natural resins including thermoplastic materials and thermosetting materials. Epoxy resins are a useful class of resins suitable for use in wellbore operations. A variety of polymers and compounds may be readily functionalized by adding epoxide functional groups to create epoxy resins. A common way to way to add epoxide functional groups to a compound is though the reaction of epichlorohydrin. In some examples, bisphenol-A (BPA) may be reacted with epichlorohydrin to produce bisphenol-A diglycidyl ether. Some examples without limitation of compounds with one or more epoxide functional groups include bisphenol-A diglycidyl ether, bisphenol-F diglycidyl ether, epoxy phenol novolacs, epoxy cresol novolacs, aliphatic alcohols and polyols reacted with epichlorohydrin, glycidyl amines, oxirane functionalized polysaccharides, and oxirane functionalized polymers. Some examples of aliphatic alcohols and polyols reacted with epichlorohydrin include without limitation dodecanol glycidyl ether, trimethylpropane triglycidyl ether, poly(propylene glycol) diglycidyl ether, and glycerol diglycidyl ether. Other suitable resins include phenol-aldehyde resins, urea-aldehyde resins, urethane resins, phenolic resins, furan and furfuryl alcohol resins, phenolic and latex-modified phenolic resins, phenol formaldehyde resins, butoxymethyl butyl glycidyl ether resins, and polyester resins. Some suitable resins, such as epoxy resins, may be cured without a hardening agent so that when pumped downhole, they may be cured using only time and temperature. An epoxy resin may also be cured with a hardening agent to accelerate curing. Some epoxy resins may also be reacted with themselves in a process of homopolymerisation. Generally, an anionic catalyst such as a Lewis base or a cationic catalyst such as a Lewis acid may be used to initiate and sustain the homopolymerisation reaction. Other suitable resins, such as furan resins generally require a time-delayed hardening agent to help activate the polymerization of the resins if the formation temperature is low (i.e., less than 250° F.), but will cure under the effects of time and temperature if the formation temperature is above about 250° F. One resin that may be used in embodiments is the WellLock™ resin system, available from Halliburton Energy Services, Inc., of Houston, Tex.

The selection of a suitable resin may be affected by the temperature of the subterranean formation to which the resin composition will be introduced. By way of example, for subterranean formations having a bottom hole static temperature ("BHST") ranging from about 60° F. to about 250° F., two-component epoxy-based resins comprising a resin component and a hardening agent may be preferred. For subterranean formations having a BHST ranging from about 300° F. to about 600° F., a furan-based resin may be preferred. For subterranean formations having a BHST ranging from about 200° F. to about 400° F., either a phenolic-based resin or a one-component HT epoxy-based resin may be suitable. For subterranean formations having a BHST of at least about 175° F., a phenol formaldehyde or furfuryl alcohol resin may also be suitable. Those of ordinary skill in the art, with the benefit of this disclosure, should be able to select a resin for a particular application.

Any of the aforementioned resins may be combined in order to increase desirable properties. In one example, a relatively higher viscosity epoxide functionalized compound such as poly(propylene glycol) diglycidyl ether is mixed with a relatively lower viscosity compound such as bisphenol-A diglycidyl ethers. The resulting mixture of resins may exhibit an intermediate viscosity and once cured, may exhibit higher flexibility, improved elongation, and impact resistance relative to a the individual cured resins. One of ordinary skill in the art with the benefit of this disclosure should be able to select a mixture of resin compounds suitable for a particular application.

As previously mentioned, the micelles of the discontinuous phase may comprise a resin composition. Generally, the resin composition may be included in the microemulsified resin additive in an amount suitable for a particular application. Without limitation, the resin composition may be included in an amount in the range of about 0.1% to about 80% by volume of the microemulsified resin additive. By way of example, the resin may be included in the microemulsified resin additive in an amount of about 0.1% to about 40% by volume of the microemulsified resin additive. Factors that may affect this determination include the type of resin and potential hardening agent desired for a particular application. Those of ordinary skill in the art, with the benefit of this disclosure, should be able to select an amount of a resin for a particular application.

The resin composition may comprise a solvent or diluent. Where used, the solvent may be in the discontinuous phase, for example. The solvent may be added to the resin to reduce the viscosity of the resin for ease of handling, mixing, and transferring, and may also facilitate microemulsion formation. Some suitable solvents without limitation may include liquid hydrocarbons and aqueous solutions. However, in some embodiments, it may be desirable to not use a solvent or diluent (e.g., for environmental or safety reasons). Factors that may affect this decision include geographic location of the well, the surrounding weather conditions, and the desired long-term stability of the well bore servicing fluid. Generally, any solvent or diluent that is compatible with the resin and that achieves the desired viscosity effect may be suitable for use in the resin composition. Some suitable solvents include without limitation alkanes, cyclic alkanes, olefins, aromatic organic compounds, aliphatic organic compounds, parrafins, diesels, mineral oils, a synthetic oils, terpenes, desulfurized hydrogenated kerosene, methyl 9-decenoate, methyl 9-dodecenoate and any combination thereof as well as aqueous solutions and brines. Suitable terpenes may include, without limitation, mono- and bicyclic monoterpenes, which may include, for example, the terpinenes, terpinolenes, limonenes, pinenes and mixtures thereof. Particular examples of terpenes may include, without limitation, d-limonene, dipentene, alpha-pinene, beta-pinene, and orange terpenes. Combinations of suitable terpenes may also be used. In addition to a solvent, a reactive diluent may be added to the resin. A reactive diluent may, among other things, modify the thermomechanical properties of the cured resin network. For example, some reactive diluents may increase flexibility or toughness of the cured resin network. Some diluents may act as co-reactants that are incorporated into the resin. Diluents that are reactive may comprise amine or epoxide functional groups. Suitable diluents may include, but are not limited to, butyl glycidyl ether, cyclohexane dimethanol diglycidyl ether, polyethylene glycol, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d-limonene, fatty acid methyl esters, or any combinations thereof. Selection of an appropriate solvent and diluent may be dependent on the resin chosen. Without limitation, the amount of the solvent or diluent used in the resin composition may be in the range of about 0.1% to about 30% by weight of the resin composition. Optionally, the resin composition may be heated to reduce its viscosity, in place of, or in addition to, using a solvent or diluent. Those of ordinary skill in the art, with the benefit of this disclosure, should be able to select a type of and the amount of solvent or diluent for a particular application.

A microemulsified resin additive may comprise an emulsifying surfactant. The emulsifying surfactant may promote stability of the micelles in solution and minimize or prevent coalescence, flocculation, and creaming. In general, an emulsifying surfactant should be able to emulsify the components of the emulsion, disperse the emulsion, and stabilize the micelles. The function that a particular surfactant may perform depends on a variety of factors. These factors may include, but are not limited to, the choice of the hydrophobic and hydrophilic portions and the relative amounts thereof and the presence of any cationic, ionic, non-ionic, amphoteric, or Zwitterionic groups. Some suitable emulsifying surfactants may include without limitation betaine, a sulfated alkoxylate; a sulfonated alkoxylate; an alkyl quarternary amine; an alkoxylated linear alcohol, an alkyl sulfonate, an alkyl aryl sulfonate, C10-C20 alkyldiphenyl ether sulfonate, a polyethylene glycol, an ether of alkylated phenol, a sodium dodecylsulfate, an alpha olefin sulfonate, an arginine methyl ester, an alkanolamine, an alkylenediamide, an alkyl ester sulfonate, an alkyl ether sulfonate, an alkyl ether sulfate, an alkali metal alkyl sulfate, a sulfosuccinate, an alkyl disulfonate, an alky aryl disulfonate, an alkyl disulfate, an alcohol polypropoxylated sulfate, an alcohol polyethoxylated sulfate, a taurate, an amine oxide, an alkylamine oxides, an ethoxylated amide, an alkoxylated fatty acid, an alkoxylated alcohol, an ethoxylated fatty amine, an ethoxylated alkyl amine, an alkylaminobetaine, a quaternary ammonium compound, tristyrylphenol ethoxylate, polyoxyethelene styrenated phenyl ether any derivative thereof, and any combination thereof. The emulsifying surfactant may be present in any amount suitable for a particular application. Without limitation, the emulsifying surfactant may be present in any amount from about 0.1% to about 10% by volume in the microemulsified resin additive. In some examples the emulsifying surfactant is present in an amount of about 0.1% to about 5% by volume. Those of ordinary skill in the art, with the benefit of this disclosure, should be able to select a type of and the amount of emulsifying surfactant for a particular application.

The microemulsified resin additive may further comprise a dispersant. Without limitation, suitable dispersants may include any of a variety of commonly used oilfield dispersants, such as sulfonated dispersants; sulfonated polymer dispersants; naphthalene sulfonates; melamine sulfonates; sulfonated melamine formaldehyde condensate; sulfonated naphthalene formaldehyde condensate; sulfonate acetone formaldehyde condensate; ethoxylated polyacrylates; or combinations thereof. Without limitation, the dispersant may be present in any amount from about 0.1% to about 10% by volume in the microemulsified resin composition. In some examples the dispersant may be present in an amount of about 0.1% to about 5% by volume. Those of ordinary skill in the art, with the benefit of this disclosure, should be able to select a type of and the amount of dispersant for a particular application.

The microemulsified resin additive may further comprise a defoaming agent. Suitable defoaming agents may include compounds used in well operations to prevent a well treatment fluid from foaming during mixing and pumping. Without limitation, suitable defoaming agents may include polyol compositions, siloxanes such as polydimethyl siloxane, acetylenic diols, and combinations thereof. The defoaming agent may be included in the microemulsified resin additive in addition to, or separate from, the dispersant. Without limitation, the defoaming agent may be present in any amount from about 0.1% to about 10% by volume of the microemulsified resin additive. In some examples the defoaming agent may be present in an amount of about 0.1% to about 5%. Those of ordinary skill in the art, with the benefit of this disclosure, should be able to select a type of and the amount of defoaming agent for a particular application.

Without limitation, the microemulsified resin additive may be included in the treatment fluid in an amount suitable for a particular application. Without limitation, the microemulsified resin additive may be included in an amount in the range of about 1% to about 100% by volume of the treatment fluid. By way of example, the microemulsified resin additive may be included in the treatment fluid in an amount of about 1% to about 40% by volume and, alternatively, from about 5% to about 25% by volume. Those of ordinary skill in the art, with the benefit of this disclosure, should be able to select an amount of a microemulsified resin additive for a particular application.

The treatment fluid may comprise a hardening agent. As used herein, "hardening agent" refers to any substance capable of transforming the resin into a hardened, consolidated mass. Examples of suitable hardening agents include, but are not limited to, aliphatic amines, aliphatic tertiary amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, N-aminophenyl piperazine, imidazoline, 1,2-diaminocyclohexane, polytheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof. Commercial examples of hardening agents may include, but are not limited to, ETHACURE® 100 curative, available from Albemarle Corp. of Baton Rouge, La., and JEFFAMINE® D-230 polyetheramine, available from Huntsman Corp. of The Woodlands, Tex. The hardening agent may be included in the treatment fluid in an amount sufficient to at least partially harden the resin. Without limitation, the hardening agent may be included in the treatment in the range of about 1% to about 20% by volume of the treatment fluid. By way of example, the hardening agent may be included in the treatment fluid in an amount of about 1% to about 10% by volume of the treatment fluid. In some examples, the hardening agent may be present in the resin composition. When the hardening agent is present in the resin composition, the hardening agent may comprise an emulsion. The hardening agent may comprise micelles from about 1 nm to about 1 micron. Those of ordinary skill in the art, with the benefit of this disclosure, should be able to select a type of hardening agent and amount of hardening agent for a particular application.

Without limitation, the amount of hardening agent may be selected to impart a desired elasticity or compressibility. Without limitation, generally, the lower the amount of hardening agent present in the treatment fluid, the greater the elasticity or compressibility will be. With the benefit of this disclosure, those of ordinary skill in the art should be able to select an appropriate amount of hardening agent to achieve a desired elasticity or compressibility for a particular application.

Without limitation, the hardening agent may comprise a mixture of hardening agents selected to impart particular qualities to the treatment fluid. For example, the hardening agent may comprise a fast-setting hardening agent and a slow-setting hardening agent. As used herein, "fast-setting hardening agent" and "slow-setting hardening agent" do not imply any specific rate at which the agents set a resin; instead, the terms merely indicate the relative rates at which the hardening agents initiate hardening of the resin. Whether a particular hardening agent is considered fast-setting or slow-setting may depend on the other hardening agent(s) with which it is used. In a particular example, ETHACURE® 100 curative may be used as a slow-setting hardening agent, and JEFFAMINE® D-230 polyetheramine may be used as a fast-setting hardening agent. In some embodiments, the ratio of fast-setting hardening agent to slow-setting hardening agent may be selected to achieve a desired behavior of the hardening agent. For example, in some embodiments, the fast-setting hardening agent may be included in a ratio of approximately 1:5, by volume, with the slow-setting hardening agent. Those of ordinary skill in the art, with the benefit of this disclosure, should be able to select a mixture of hardening agents for a particular application.

The hardening agent may also comprise an optional silane coupling agent. The silane coupling agent may be used, among other things, to act as a mediator to help bond the resin to the surface of the subterranean formation and/or the surface of the well bore. Examples of suitable silane coupling agents include, but are not limited to, N-2-(aminoethyl)-3-aminopropyltrimethoxysi lane; 3-glycidoxypropyl-trimethoxysilane; gamma-aminopropyltriethoxysilane; N-beta-(aminoethyl)-gamma-aminopropyltrimethoxysilanes; aminoethyl-N-beta-(aminoethyl)-gamma-aminopropyl-trimethoxysilanes; gamma-ureidopropyl-triethoxysilanes; beta-(3-4 epoxy-cyclohexyl)-ethyl-trimethoxysilane; gamma-glycidoxypropyltrimethoxysilanes; vinyltrichlorosilane; vinyltris (beta-methoxyethoxy) silane; vinyltriethoxysilane; vinyltrimethoxysilane; 3-metacryloxypropyltrimethoxysilane; beta-(3,4 epoxycyclohexyl)-ethyltrimethoxysilane; r-glycidoxypropyltrimethoxysilane; r-glycidoxypropylmethylidiethoxysilane; N-beta-(aminoethyl)-r-aminopropyl-trimethoxysilane; N-beta-(aminoethyl)-r-aminopropylmethyldimethoxysilane; 3-aminopropyl-triethoxysilane; N-phenyl-r-aminopropyltrimethoxysilane; r-mercaptopropyltrimethoxysilane; r-chloropropyltrimethoxysilane; vinyltrichlorosilane; vinyltris (beta-methoxyethoxy) silane; vinyltrimethoxysilane; r-metacryloxypropyltrimethoxysilane; beta-(3,4 epoxycyclohexyl)-ethyltrimethoxysila; r-glycidoxypropyltrimethoxysilane; r-glycidoxypropylmethylidiethoxysilane; N-beta-(aminoethyl)-r-aminopropyltrimethoxysilane; N-beta-(aminoethyl)-r-aminopropylmethyldimethoxysilane; r-aminopropyltriethoxysilane; N-phenyl-r-aminopropyltrimethoxysilane; r-mercaptopropyltrimethoxysilane; r-chloropropyltrimethoxysilane; N[3-(trimethoxysilyl)propyl]-ethylenediamine; substituted silanes where one or more of the substitutions contains a different functional group; or any combinations thereof. Generally, the silane coupling agent may be included in the hardening agent in an amount capable to sufficiently bond the resin. Where used, the silane coupling agent may be included in the hardening agent in the range of about 0.1% to about 95% by volume of the hardening agent. Those of ordinary skill in the art, with the benefit of this disclosure, should be able to select a silane coupling agent for a particular application.

The treatment fluid may comprise a carrier fluid. The carrier fluid may comprise any fluid capable of carrying the microemulsified resin additive and hardening agent into the subterranean formation. The carrier fluid should not undesirably interact with any components of the microemulsified resin composition or hardening agent. Suitable carrier fluids include, but are not limited to, alkanes, cyclic alkanes, olefins, aromatic organic compounds, aliphatic organic compounds, paraffins, diesels, mineral oils, a synthetic oils, desulfurized hydrogenated kerosene, and any combination thereof as well as aqueous fluids. Suitable aqueous fluids that may be used in the treatments fluids may include, but are not limited to, fresh water, salt water, brine, seawater, or any other aqueous fluid that does not undesirably react with the other components used in treatment fluid or with the subterranean formation. Without limitation, the aqueous fluid base may comprise a brine, such as a potassium chloride brine.

The treatment fluid generally should have a density suitable for a particular application as desired by those of ordinary skill in the art. Without being limited by theory, the density of the treatment fluid may be adjusted to achieve the proper density hierarchy for placement of the resin. Without limitation, the treatment fluid may have a density in the range of from about 5 pounds per gallon ("ppg") to about 17 ppg. By way of example, the treatment fluid may have a density in the range of about 8 ppg to about 14 ppg. In yet other examples, the treatment fluid may have a density in the range of about 10 ppg to about 12 ppg. Further, filler particles may be chosen which modify the mechanical properties of the set resin or the fluid properties of the liquid (uncured) resin. Such filler particles may have the same density as the resin so that the bulk density is not changed. Examples of suitable filler particles may include, but are not limited to, aluminum oxide, awaruite, barium carbonate, barium oxide, barite, calcium carbonate, calcium oxide, cenospheres, chromite, chromium oxide, copper, copper oxide, dolomite, galena, hematite, hollow glass microspheres, ilmenite, iron oxide, siderite, magnetite, magnesium oxide, manganese carbonate, manganese dioxide, manganese (IV) oxide, manganese oxide, manganese tetraoxide, manganese (II) oxide, manganese (III) oxide, molybdenum (IV) oxide, molybdenum oxide, molybdenum trioxide, Portland cement, pumice, pyrite, spherelite, silica, silver, tenorite, titania, titanium (II) oxide, titanium (III) oxide, titanium (IV) dioxide, zirconium oxide, zirconium silicate, zinc oxide, cement-kiln dust, unexpanded and expanded perlite, attapulgite, bentonite, zeolite, elastomers, sand, micronized polymers, waxes, polymer fibers, inorganic fibers and any combination thereof. It should be noted that the foregoing list encompasses all crystal forms of any material. Those of ordinary skill in the art, with the benefit of this disclosure, should recognize the appropriate density of the resin composition for a particular application.

The treatment fluid may be foamed with a gas, for example, to provide a treatment fluid with a reduced density. It should be understood that reduced densities may be needed for the treatment fluid to further penetrate into a tight sand formation. A treatment fluid may be considered lightweight if it has a density of less than about 13 ppg, alternatively, less than about 10 ppg, and alternatively less than about 9 ppg. Without limitation, the treatment fluids may be foamed to have a density within about 10% of the density of the un-foamed treatment fluid and, alternatively, within about 5% of the density of the un-foamed treatment fluid. While techniques, such as lightweight additives, may be used to reduce the density of the treatment fluids comprising microemulsified resin additives without foaming, these techniques may have drawbacks. For example, reduction of the treatment fluid's density to below about 13 ppg using lightweight additives may produce unstable slurries, which can have problems with settling of solids, floating of lightweight additives, and free water, among others. Accordingly, the treatment fluid may be foamed to provide a treatment fluid having a reduced density that is more stable.

Therefore, in some examples, the treatment fluid may be foamed and comprise a microemulsified resin additive, a hardening agent, a carrier fluid, a foaming agent, and a gas. Optionally, to provide a treatment fluid with a lower density and more stable foam, the foamed treatment fluid may further comprise a lightweight additive, for example. With the lightweight additive, a base slurry may be prepared that may then be foamed to provide an even lower density. In some examples, the foamed treatment fluid may have a density in the range of from about 4 lb/gal to about 13 lb/gal and, alternatively, about 7 lb/gal to about 9 lb/gal. In one particular example, a base slurry may be foamed from a density of in the range of from about 9 lb/gal to about 13 lb/gal to a lower density, for example, in a range of from about 7 lb/gal to about 9 lb/gal.

Without limitation, the gas used in the foamed treatment fluids may be any suitable gas for foaming the treatment fluid, including, but not limited to air, nitrogen, and combinations thereof. Generally, the gas should be present in examples of the foamed treatment fluids in an amount sufficient to form the desired foam. By way of example, the gas may be present in an amount in the range of from about 5% to about 80% by volume of the foamed treatment fluid at atmospheric pressure, alternatively, about 5% to about 55% by volume, and, alternatively, about 15% to about 30% by volume.

Where foamed, examples of the treatment fluids may comprise a foaming agent for providing a suitable foam. As used herein, the term "foaming agent" refers to a material or combination of materials that facilitate the formation of a foam in a liquid. Any suitable foaming agent for forming a foam in an aqueous liquid may be used in embodiments of the treatment fluids. Examples of suitable foaming agents may include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; amine oxides, alpha olefin sulfonate, alkylaryl sulfonates, and combinations thereof. An example of a suitable foaming agent is FOAMER™ 760 foamer/stabilizer, HC-2™ agent, and Pen-5M™ foaming agent, all available from Halliburton Energy Services, Inc. Generally, the foaming agent may be present in embodiments of the foamed treatment fluids in an amount sufficient to provide a suitable foam. In some embodiments, the foaming agent may be present in an amount in the range of from about 0.8% to about 5% by volume of the treatment fluid.

Examples of the treatment fluid may be prepared in accordance with any suitable technique. In some examples, the desired quantity of microemulsified resin additive may be introduced into a mixer (e.g., a batch mixer) prior to or followed by the addition of any hardening agent and/or carrier fluid. Additional additives, if any, may be added to the mixer as desired prior to, or after, the addition of the microemulsified resin additive to the mixer. This mixture may be agitated for a sufficient period of time. By way of example, pumps may be used for delivery of the treatment fluid into the wellbore. As will be appreciated by those of ordinary skill in the art, with the benefit of this disclosure, other suitable techniques for preparing the treatment fluid comprising microemulsified resin additive may be used.

The microemulsified resin additive may be prepared in accordance with any suitable technique. In some examples, a volume of resin may be introduced into a first container. A predetermined volume of surfactant, solvents or diluents, and other additives may be introduced into the first container. The surfactant may comprise a main surfactant and any number of co-surfactants. Solvents may comprise any suitable solvents including those listed previously for use in the microemulsified resin additive. The contents of the first container may be sonicated for a predetermined amount of time at a predetermined temperature, for example, until the resin is completely dissolved, to form a dissolved resin composition. By way of example, the contents of the first container may be sonicated for a time of from about 1 minute to about 20 minutes at temperature from about 20° C. to about 60° C. A volume of water may be introduced into a second container. A predetermined volume of organic solvent and surfactant may be introduced into the second container. The organic solvent and the surfactant may the same or different than the surfactants and solvents added to the first container. The contents of the second container may be sonicated for a predetermined amount of time at a predetermined temperature, for example, until the aqueous solution is homogeneous, to form an aqueous composition. By way of example, the contents of the second container may be sonicated for a time of from about 1 minute to about 20 minutes at temperature from about 20° C. to about 60° C. A volume of the dissolved resin composition and the aqueous composition may then be mixed and sonicated. By way of example, a volume of the resin composition from the first container may be introduced into a third container along with a predetermined volume of the aqueous composition from the second container. The mixture of the resin composition and the aqueous composition (e.g., the contents of the third container) may be mixed, for example, to form the microemulsified resin composition. Without limitation, mixture of the resin composition and the aqueous composition (e.g., the contents of the third container) may be sonicated a predetermined amount of time at a predetermined temperature until the microemulsion is isotropic. A microemulsion resin composition prepared by the method described above may exhibit improved stability without coalescence, flocculation, or creaming. Furthermore, a microemulsified resin composition prepared by this method may allow resins that are thermodynamically unstable in micron-sized emulsions to remain infinitely stable in nanometer-sized emulsions. For example, in micron-sized emulsions, bisphenol-A resins may coalesce over time but in nanometer-sized emulsion, the bisphenol-A may remain stable.

As discussed above and as will be appreciated by those of ordinary skill in the art, the treatment fluid may be used in a variety of subterranean operations where it is desirable to reduce the flow of unwanted fluids and solids, such as conformance treatments, consolidation treatments, and lost circulation control amongst others. The treatment fluid may be used prior to, during, or subsequent to a variety of subterranean operations. Methods of using the treatments fluids may first include preparing the treatment fluid. The treatment fluid may be prepared in any suitable manner, for example, by combining the microemulsified resin additive, hardening agent, and carrier fluid, and any of the additional components described herein in any suitable order. The treatment fluid may be used as a single-step treatment in which the microemulsified resin additive, hardening agent, and carrier fluid are mixed and then introduced into the subterranean formation for cross-linking. In some examples, it may be desirable to form the treatment fluid immediately prior to use to prevent premature cross-linking before reaching the desired location in the subterranean formation. Alternatively, the treatment fluid may be used as a multi-step treatment in which the microemulsified resin composition and the hardening agent may be separately introduced into the subterranean formation for cross-linking. For example, the hardening agent may be placed into the subterranean formation where it may be contacted with the microemulsified resin additive, which may already be present in the formation or subsequently introduced.

Without limitation, the treatment fluid may be used in consolidation applications. In consolidation applications, the treatment fluid may consolidate unwanted solids such sand and may even agglomerate other types of unwanted solids such as fines. Fines, as defined herein, are any type of unwanted solid particle that will not be removed by a shaker screen. The consolidation of unwanted solids, such as sand may be done to stabilize the subterranean formation and also so that the sand is not produced. Production of unwanted solids such as sand may damage well equipment and/or the subterranean formation. Conversely, fines may typically be produced so as to avoid near-wellbore damage. The agglomeration of the fines, should such agglomeration reach a sufficient level, may allow for the fines to not be produced in a manner similar to consolidated unwanted solids such as sand. Further, the agglomeration of the fines may allow for the fines that are produced to be filtered using shaker screens or any other sufficient filtration method, whereas non-agglomerated fines may not be removed via shaker screens.

In some examples a method of well treatment may comprise: providing a treatment fluid comprising a microemulsified resin additive, wherein the microemulsified resin additive comprises a continuous phase and a discontinuous phase, wherein the continuous phase comprises an aqueous liquid, wherein the discontinuous phase is in form of micelles of about 200 nm or less in diameter and comprises a resin; introducing the treatment fluid into a subterranean formation penetrated by a wellbore; and allowing the treatment fluid to set in the subterranean formation. The method may comprise any of the following features in any combination. The micelles of the discontinuous phase are about 100 nanometers or less in diameter. The resin may be selected from the group consisting of epoxy resins, phenol-aldehyde resins, urea-aldehyde resins, urethane resins, phenolic resins, furan and furfuryl alcohol resins, phenolic and latex-modified phenolic resins, phenol formaldehyde resins, butoxymethyl butyl glycidyl ether resins, and polyester resins and any combination thereof. The treatment fluid may comprise a carrier fluid, wherein the carrier fluid comprises a carrier fluid selected from the group consisting of alkanes, cyclic alkanes, olefins, aromatic organic compounds, aliphatic organic compounds, paraffins, diesels, mineral oils, a synthetic oils, desulfurized hydrogenated kerosene, fresh water, salt water, brine, and any combinations thereof. The microemulsified resin composition may further comprise at least one component selected from the group consisting of co-reactants, surfactants, solvents, diluents, and combinations thereof. The microemulsified resin additive may comprise an emulsifying surfactant selected from the group consisting of betaine, a sulfated alkoxylate; a sulfonated alkoxylate; an alkyl quarternary amine; an alkoxylated linear alcohol, an alkyl sulfonate, an alkyl aryl sulfonate, C10-C20 alkyldiphenyl ether sulfonate, a polyethylene glycol, an ether of alkylated phenol, a sodium dodecylsulfate, an alpha olefin sulfonate, an arginine methyl ester, an alkanolamine, an alkylenediamide, an alkyl ester sulfonate, an alkyl ether sulfonate, an alkyl ether sulfate, an alkali metal alkyl sulfate, a sulfosuccinate, an alkyl disulfonate, an alky aryl disulfonate, an alkyl disulfate, an alcohol polypropoxylated sulfate, an alcohol polyethoxylated sulfate, a taurate, an amine oxide, an alkylamine oxides, an ethoxylated amide, an alkoxylated fatty acid, an alkoxylated alcohol, an ethoxylated fatty amine, an ethoxylated alkyl amine, an alkylaminobetaine, a quaternary ammonium compound, tristyrylphenol ethoxylate, polyoxyethelene styrenated phenyl ether any derivative thereof, and any combination thereof.

In some examples, a method of producing a microemulsified resin additive may comprise: providing a first composition comprising a resin, a first solvent, and a surfactant; sonicating the first composition surfactant to produce a dissolved resin composition; providing a second composition comprising water, a second solvent, and a second surfactant; sonicating the second composition to produce an aqueous composition; and mixing the dissolved resin composition and the aqueous composition; sonicating the mixture of the dissolved resin composition and the aqueous composition to produce a microemulsified resin additive wherein the microemulsified resin additive comprises micelles of about 200 nanometers or less in diameter. The method may comprise any of the following features in any combination. The resin may be selected from the group consisting of epoxy resins, phenol-aldehyde resins, urea-aldehyde resins, urethane resins, phenolic resins, furan and furfuryl alcohol resins, phenolic and latex-modified phenolic resins, phenol formaldehyde resins, butoxymethyl butyl glycidyl ether resins, and polyester resins and any combination thereof. The micelles of the microemulsified resin additive may be about 100 nanometers or less in diameter.

In some examples, a treatment fluid may comprise: a microemulsified resin additive, wherein the microemulsified resin additive comprises a continuous phase and a discontinuous phase, wherein the continuous phase comprises an aqueous liquid, wherein the discontinuous phase is in form of micelles of about 1 micron or less in diameter and comprises a resin; a hardening agent; and a carrier fluid. The treatment fluid may comprise any of the following features in any combination. The microemulsion resin additive may further comprise at least one component selected from the group consisting of co-reactants, surfactants, solvents, diluents, and combinations thereof. The resin may be selected from the group consisting of epoxy resins, phenol-aldehyde resins, urea-aldehyde resins, urethane resins, phenolic resins, furan and furfuryl alcohol resins, phenolic and latex-modified phenolic resins, phenol formaldehyde resins, butoxymethyl butyl glycidyl ether resins, and polyester resins and any combination thereof. The micelles of the microemulsified resin additive may be about 100 nanometers or less in diameter. The treatment fluid may further comprise a foaming agent and a gas. The microemulsified resin composition may further comprise at least one emulsifying surfactant selected from the group consisting of betaine, a sulfated alkoxylate; a sulfonated alkoxylate; an alkyl quarternary amine; an alkoxylated linear alcohol, an alkyl sulfonate, an alkyl aryl sulfonate, C10-C20 alkyldiphenyl ether sulfonate, a polyethylene glycol, an ether of alkylated phenol, a sodium dodecylsulfate, an alpha olefin sulfonate, an arginine methyl ester, an alkanolamine, an alkylenediamide, an alkyl ester sulfonate, an alkyl ether sulfonate, an alkyl ether sulfate, an alkali metal alkyl sulfate, a sulfosuccinate, an alkyl disulfonate, an alky aryl disulfonate, an alkyl disulfate, an alcohol polypropoxylated sulfate, an alcohol polyethoxylated sulfate, a taurate, an amine oxide, an alkylamine oxides, an ethoxylated amide, an alkoxylated fatty acid, an alkoxylated alcohol, an ethoxylated fatty amine, an ethoxylated alkyl amine, an alkylaminobetaine, a quaternary ammonium compound, tristyrylphenol ethoxylate, polyoxyethelene styrenated phenyl ether any derivative thereof, and any combination thereof.

In some examples, a system of well treatment may comprise: a treatment fluid comprising a microemulsified resin additive, a hardening agent, and a carrier fluid, wherein the microemulsified resin additive comprises a continuous phase and a discontinuous phase, wherein the continuous phase comprises an aqueous liquid, wherein the discontinuous phase is in form of micelles of about 200 nanometers or less in diameter and comprises a resin a fluid handling system comprising the treatment fluid; and a conduit fluidically connected to the fluid handling system and a wellbore. The system may comprise any of the following features in any combination. The treatment fluid may be foamed. The treatment fluid may further comprise a foaming agent and a gas. The fluid handling system may comprise mixing equipment configured to mix the treatment fluid and pumping equipment configured to transport the treatment fluid into a subterranean formation penetrated by a wellbore. The microemulsion resin additive may further comprise at least one component selected from the group consisting of co-reactants, surfactants, solvents, diluents, and combinations thereof. The resin may be selected from the group consisting of epoxy resins, phenol-aldehyde resins, urea-aldehyde resins, urethane resins, phenolic resins, furan and furfuryl alcohol resins, phenolic and latex-modified phenolic resins, phenol formaldehyde resins, butoxymethyl butyl glycidyl ether resins, and polyester resins and any combination thereof. The micelles of the microemulsified resin additive may be about 100 nanometers or less in diameter. The microemulsified resin composition may further comprise at least one emulsifying surfactant selected from the group consisting of betaine, a sulfated alkoxylate; a sulfonated alkoxylate; an alkyl quarternary amine; an alkoxylated linear alcohol, an alkyl sulfonate, an alkyl aryl sulfonate, C10-C20 alkyldiphenyl ether sulfonate, a polyethylene glycol, an ether of alkylated phenol, a sodium dodecylsulfate, an alpha olefin sulfonate, an arginine methyl ester, an alkanolamine, an alkylenediamide, an alkyl ester sulfonate, an alkyl ether sulfonate, an alkyl ether sulfate, an alkali metal alkyl sulfate, a sulfosuccinate, an alkyl disulfonate, an alky aryl disulfonate, an alkyl disulfate, an alcohol polypropoxylated sulfate, an alcohol polyethoxylated sulfate, a taurate, an amine oxide, an alkylamine oxides, an ethoxylated amide, an alkoxylated fatty acid, an alkoxylated alcohol, an ethoxylated fatty amine, an ethoxylated alkyl amine, an alkylaminobetaine, a quaternary ammonium compound, tristyrylphenol ethoxylate, polyoxyethelene styrenated phenyl ether any derivative thereof, and any combination thereof.

Example methods of using the treatment fluids will now be described in more detail with reference to FIGS. 1 and 2. Any of the previous examples of the treatment fluids may apply in the context of FIGS. 1 and 2. Referring now to FIG. 1, a fluid handling system 2 is illustrated. The fluid handling system 2 may be used for preparation of the treatment fluid and for introduction of the treatment fluid into a wellbore. The fluid handling system 2 may include mobile vehicles, immobile installations, skids, hoses, tubes, fluid tanks or reservoirs, pumps, valves, and/or other suitable structures and equipment. For example, the fluid handling system 2 may include a fluid supply 4 and pumping equipment 6, both of which may be fluidically coupled with a wellbore supply conduit 8. The fluid supply 4 may contain the treatment fluid. The pumping equipment 6 may be used to supply the treatment fluid from the fluid supply 4, which may include tank, reservoir, connections to external fluid supplies, and/or other suitable structures and equipment. While not illustrated, the fluid supply 4 may contain one or more components of the sealant composition in separate tanks or other containers that may be mixed at any desired time. Pumping equipment 6 may be fluidically coupled with the wellbore supply conduit 8 to communicate the sealant composition into the wellbore. Fluid handling system 2 may also include surface and downhole sensors (not shown) to measure pressure, rate, temperature and/or other parameters of treatment. Fluid handling system 2 may include pump controls and/or other types of controls for starting, stopping, and/or otherwise controlling pumping as well as controls for selecting and/or otherwise controlling fluids pumped during the injection treatment. An injection control system may communicate with such equipment to monitor and control the injection treatment. Fluid handling system 2 can be configured as shown in FIG. 1 or in a different manner, and may include additional or different features as appropriate. Fluid handling system 2 may be deployed via skid equipment, marine vessel, or may be comprised of sub-sea deployed equipment.

Figure 2:
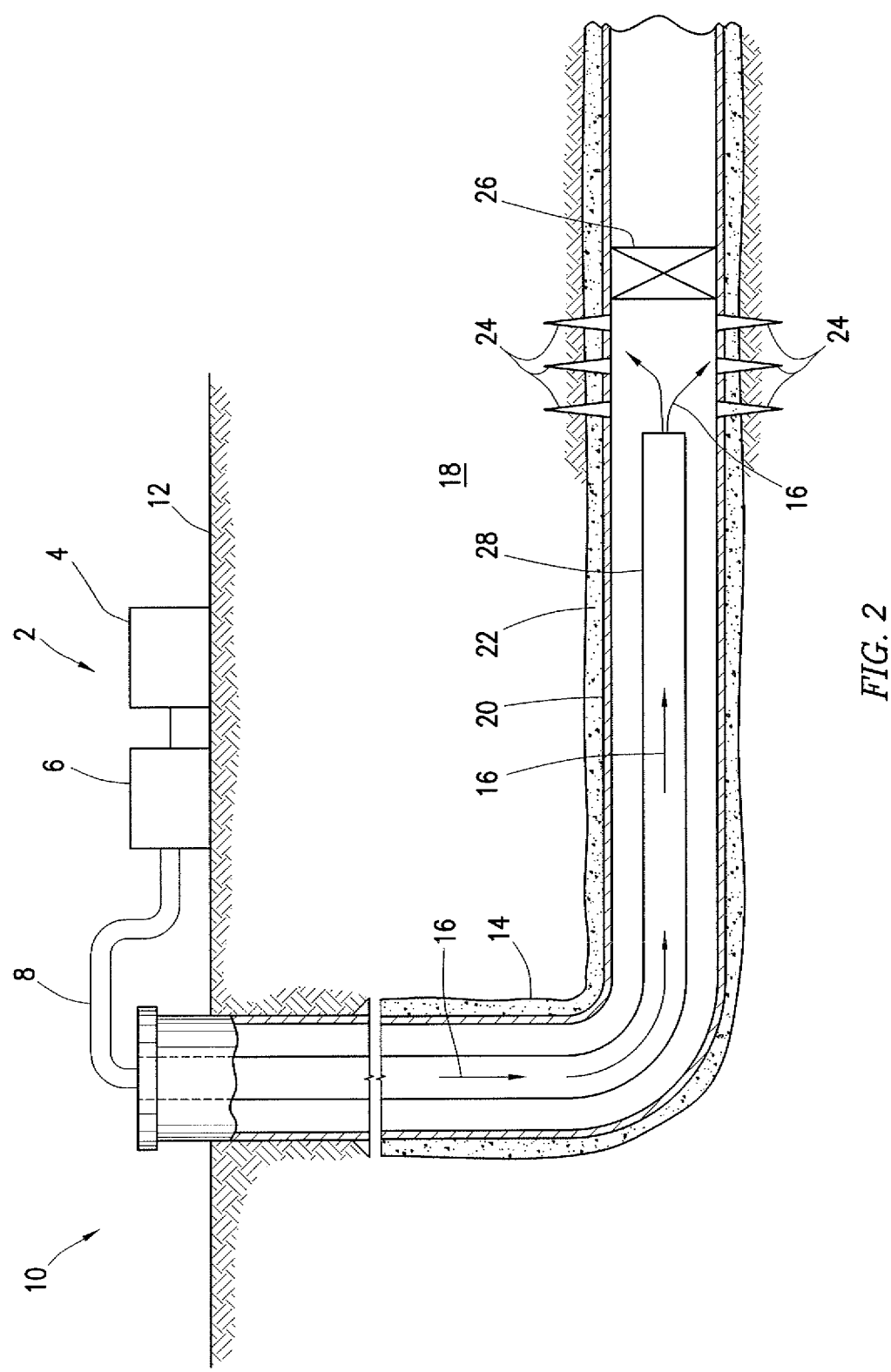
FIG. 2 is a schematic illustration of example well system showing placement of a treatment fluid into a wellbore.

Turning now to FIG. 2, an example well system 10 is shown. As illustrated, the well system 10 may include a fluid handling system 2, which may include fluid supply 4, pumping equipment 6, and wellbore supply conduit 8. As previously described in connection with FIG. 2, pumping equipment 6 may be fluidically coupled with the wellbore supply conduit 8 to communicate the treatment fluid into wellbore 14. As depicted in FIG. 2, the fluid supply 4 and pumping equipment 6 may be above the surface 12 while the wellbore 14 is below the surface 12. Well system 10 may be configured as shown in FIG. 2 or in a different manner, and may include additional or different features as appropriate.

As illustrated on FIG. 2, the well system 10 may be used for introduction of a treatment fluid 16, described herein, into subterranean formation 18 surrounding the wellbore 14. Generally, a wellbore 14 may include horizontal, vertical, slanted, curved, and other types of wellbore geometries and orientations, and the treatment fluid 16 may generally be applied to subterranean formation 18 surrounding any portion of wellbore 14. As illustrated, the wellbore 14 may include a casing 20 that may be cemented (or otherwise secured) to wellbore wall by cement sheath 22. Perforations 24 can be formed in the casing 20 and cement sheath 22 to allow treatment fluids (e.g., treatment fluid 16) and/or other materials to flow into and out of the subterranean formation 18. Perforations 24 can be formed using shape charges, a perforating gun, and/or other tools. A plug 26, which may be any type of plug (e.g., bridge plug, etc.) may be disposed in wellbore 14 below the perforations 24.

The treatment fluid 16, which may comprise the microemulsified resin composition, hardening agent, and optional carrier fluid may be pumped from fluid supply 4 down the interior of casing 20 in wellbore 14. As illustrated, well conduit 28 (e.g., coiled tubing, drill pipe, etc.) may be disposed in casing 20 through which the treatment fluid 16 may be pumped. The well conduit 28 may be the same or different than the wellbore supply conduit 8. For example, the well conduit 28 may be an extension of the wellbore supply conduit 8 into the wellbore 14 or may be tubing or other conduit that is coupled to the wellbore supply conduit 8. The treatment fluid 16 may be allowed to flow down the interior of well conduit 28, exit the well conduit 28, and finally enter subterranean formation 18 surrounding wellbore 14 by way of perforations 24 through the casing 20 and cement sheath 22. The treatment fluid 16 may undergo a cross-linking reaction in the subterranean formation 18 to form a gel network that blocks certain flow paths therein, reducing the flow of unwanted fluids and/or solids through the subterranean formation 18. In other examples, the treatment fluid 16 may form a monolayer with strong bonds with a substrate (e.g., silica/sand stone) and may stabilize a portion of the subterranean formation 18 via consolidation. In still other examples, the treatment fluid 16 may agglomerate fines, allowing for the produced agglomerated fines to be filtered via shaker screen or other suitable filtration method.

The exemplary treatment fluids disclosed herein may directly or indirectly affect one or more components or pieces of equipment associated with the preparation, delivery, recapture, recycling, reuse, and/or disposal of the treatment fluids. For example, the treatment fluids may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the sealant compositions. The treatment fluids may also directly or indirectly affect any transport or delivery equipment used to convey the treatment fluid to a well site or downhole such as, for example, any transport vessels, conduits, pipelines, trucks, tubulars, and/or pipes used to compositionally move the treatment fluids from one location to another, any pumps, compressors, or motors (e.g., topside or downhole) used to drive the treatment fluids into motion, any valves or related joints used to regulate the pressure or flow rate of the resin composition and other fluids, or fluids containing the same resin composition, and any sensors (i.e., pressure and temperature), gauges, and/or combinations thereof, and the like. The disclosed treatment fluids may also directly or indirectly affect the various downhole equipment and tools that may come into contact with the treatment fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present embodiments, the following examples of some of the preferred embodiments are given. In no way should such examples be read to limit, or to define, the scope of the disclosure.

Example 1

A microemulsified resin composition was prepared by the following procedure. A 3 mL aliquot of a BPA-based epoxy resin was placed into a test tube. 1 mL of orange terpene and 1 mL of n-butanol was added. The epoxy resin in oil solution was placed under sonication for 5 minutes at 40° C. until the epoxy resin was fully dissolved. An aqueous surfactant solution was prepared by combining 3 mL of deionized water along with 1 ml of n-butanol, 1.5 ml of a nonionic styrenated phenol surfactant, and a 1.5 ml of a tristytylphenol ethoxylated surfactant in a test tube. The aqueous surfactant solution was sonicated at 40° C. for 5 minutes. The aqueous surfactant solution appeared homogeneous. A 3 mL aliquot of the epoxy resin in oil solution was added to the aqueous surfactant solution and the test tube was sonicated for 5 additional minutes at 40° C. The test tube was then placed in a rotating mixer for 3 hours. The resulting microemulsified resin composition appears indefinitely stable as a microemulsion with no visible precipitate.

Example 2

A 1 mL aliquot of the microemulsified resin composition from Example 1 was added to a 50 mL solution of 7% KCl. The solution developed a turbid and cloudy appearance with a slight formation of precipitate. A 2 mL aliquot of tristyrylphenol ethoxylate sulfate was added to the solution and the solution cleared to a slightly hazy color with no observable precipitation. The solution was then subjected to a quasi-elastic light scattering (QELS) test to determine the size of the micelles. The average micelle size was found to be 52.2±29.1 nm.

Example 3

The consolidation properties of the microemulsified resin composition from Example were tested by placing 50 grams of 20/25 mesh sand in a container and adding 1 mL of hardening agent and 1 mL of the microemulsified resin composition. The components were mixed thoroughly and placed in a cylindrical container. The container was placed in an oven at 200° F. for 48 hours to cure the resin composition. The consolidated core was then removed and the unconfined compressive strength was measured to be over 500 psi.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of well treatment comprising:
providing a treatment fluid comprising a microemulsified resin additive, wherein the microemulsified resin additive comprises a continuous phase and a discontinuous phase, wherein the continuous phase comprises an aqueous liquid, wherein the discontinuous phase is in the form of micelles comprising a resin, wherein at least 95% or more of the micelles are about 200 nm or less in diameter;
introducing the treatment fluid into a subterranean formation penetrated by a wellbore; and
allowing the treatment fluid to set in the subterranean formation.

2. The method of claim 1, wherein the treatment fluid is foamed.

3. The method of claim 1, wherein the micelles of the discontinuous phase are about 100 nanometers or less in diameter.

4. The method of claim 1, wherein the resin is selected from the group consisting of epoxy resins, phenol-aldehyde resins, urea-aldehyde resins, urethane resins, phenolic resins, furan and furfuryl alcohol resins, phenolic and latex-modified phenolic resins, phenol formaldehyde resins, butoxymethyl butyl glycidyl ether resins, and polyester resins and any combination thereof.

5. The method of claim 1, wherein the treatment fluid comprises a carrier fluid, wherein the carrier fluid comprises a fluid selected from the group consisting of alkanes, cyclic alkanes, olefins, aromatic organic compounds, aliphatic organic compounds, paraffins, diesels, mineral oils, a synthetic oils, desulfurized hydrogenated kerosene, fresh water, salt water, brine, and any combinations thereof.

6. The method of claim 1, wherein the microemulsified resin additive further comprises at least one component selected from the group consisting of co-reactants, surfactants, solvents, diluents, and combinations thereof.

7. The method of claim 1, wherein the microemulsified resin additive comprises an emulsifying surfactant selected from the group consisting of betaine, a sulfated alkoxylate; a sulfonated alkoxylate; an alkyl quarternary amine; an alkoxylated linear alcohol, an alkyl sulfonate, an alkyl aryl sulfonate, C10-C20 alkyldiphenyl ether sulfonate, a polyethylene glycol, an ether of alkylated phenol, a sodium dodecyl sulfate, an alpha olefin sulfonate, an arginine methyl ester, an alkanolamine, an alkylenediamide, an alkyl ester sulfonate, an alkyl ether sulfonate, an alkyl ether sulfate, an alkali metal alkyl sulfate, a sulfosuccinate, an alkyl disulfonate, an alky aryl disulfonate, an alkyl disulfate, an alcohol polypropoxylated sulfate, an alcohol polyethoxylated sulfate, a taurate, an amine oxide, an alkylamine oxides, an ethoxylated amide, an alkoxylated fatty acid, an alkoxylated alcohol, an ethoxylated fatty amine, an ethoxylated alkyl amine, an alkylaminobetaine, a quaternary ammonium compound, tristyrylphenol ethoxylate, polyoxyethelene styrenated phenyl ether any derivative thereof, and any combination thereof.

8. A method of producing a microemulsified resin additive comprising:
providing a first composition comprising a resin, a first solvent, and a surfactant;
sonicating the first composition to produce a dissolved resin composition;
providing a second composition comprising water, a second solvent, and a second surfactant;
sonicating the second composition to produce an aqueous composition; and
mixing the dissolved resin composition and the aqueous composition;
sonicating the mixture of the dissolved resin composition and the aqueous composition to produce the microemulsified resin additive wherein the microemulsified resin additive comprises micelles of about 200 nanometers or less in diameter.

9. The method of claim 8 wherein the resin is selected from the group consisting of epoxy resins, phenol-aldehyde resins, urea-aldehyde resins, urethane resins, phenolic resins, furan and furfuryl alcohol resins, phenolic and latex-modified phenolic resins, phenol formaldehyde resins, butoxymethyl butyl glycidyl ether resins, and polyester resins and any combination thereof.

10. The method of claim 8, wherein the micelles of the microemulsified resin additive are about 100 nanometers or less in diameter.

11. A treatment fluid comprising:
a microemulsified resin additive, wherein the microemulsified resin additive comprises a continuous phase and a discontinuous phase, wherein the continuous phase comprises an aqueous liquid, wherein the discontinuous phase is in the form of micelles comprising a resin, wherein at least 95% or more of the micelles are about 1 micron or less in diameter;
a hardening agent; and
a carrier fluid.

12. The treatment fluid of claim 11, wherein the microemulsion resin additive further comprises at least one component selected from the group consisting of co-reactants, surfactants, solvents, diluents, and combinations thereof.

13. The treatment fluid of claim 11, wherein the resin is selected from the group consisting of epoxy resins, phenol-aldehyde resins, urea-aldehyde resins, urethane resins, phenolic resins, furan and furfuryl alcohol resins, phenolic and latex-modified phenolic resins, phenol formaldehyde resins, butoxymethyl butyl glycidyl ether resins, and polyester resins and any combination thereof.

14. The treatment fluid of claim 11, wherein the micelles of the microemulsified resin additive are about 100 nanometers or less in diameter.

15. The treatment fluid of claim 11, wherein the treatment fluid further comprises a foaming agent and a gas.

16. The composition of claim 11, wherein the microemulsified resin additive further comprises at least one emulsifying surfactant selected from the group consisting of betaine, a sulfated alkoxylate; a sulfonated alkoxylate; an alkyl quarternary amine; an alkoxylated linear alcohol, an alkyl sulfonate, an alkyl aryl sulfonate, C10-C20 alkyldiphenyl ether sulfonate, a polyethylene glycol, an ether of alkylated phenol, a sodium dodecylsulfate, an alpha olefin sulfonate, an arginine methyl ester, an alkanolamine, an alkylenediamide, an alkyl ester sulfonate, an alkyl ether sulfonate, an alkyl ether sulfate, an alkali metal alkyl sulfate, a sulfosuccinate, an alkyl disulfonate, an alky aryl disulfonate, an alkyl disulfate, an alcohol polypropoxylated sulfate, an alcohol polyethoxylated sulfate, a taurate, an amine oxide, an alkylamine oxides, an ethoxylated amide, an alkoxylated fatty acid, an alkoxylated alcohol, an ethoxylated fatty amine, an ethoxylated alkyl amine, an alkylaminobetaine, a quaternary ammonium compound, tristyrylphenol ethoxylate, polyoxyethelene styrenated phenyl ether any derivative thereof, and any combination thereof.

17. A system of well treatment comprising:
- a treatment fluid comprising a microemulsified resin additive, a hardening agent, and a carrier fluid, wherein the microemulsified resin additive comprises a continuous phase and a discontinuous phase, wherein the continuous phase comprises an aqueous liquid, wherein the discontinuous phase is in the form of micelles comprising a resin, wherein at least 95% or more of the micelles are about 200 nanometers or less in diameter;
- a fluid handling system comprising the treatment fluid; and
- a conduit fluidically connected to the fluid handling system and a wellbore.

18. The system of claim 17, wherein the treatment fluid is foamed.

19. The system of claim 17, wherein the fluid handling system comprises mixing equipment configured to mix the treatment fluid and pumping equipment configured to transport the treatment fluid into a subterranean formation penetrated by a wellbore.

* * * * *